United States Patent
Downie et al.

(10) Patent No.: US 7,526,961 B2
(45) Date of Patent: May 5, 2009

(54) METHOD AND APPARATUS FOR MONITORING FLUID PRESSURE

(75) Inventors: Neil Downie, Odiham (GB); Mathilde Pradier, Chatou (FR)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 11/828,715

(22) Filed: Jul. 26, 2007

(65) Prior Publication Data
US 2008/0173073 A1  Jul. 24, 2008

(30) Foreign Application Priority Data
Aug. 2, 2006 (EP) .................... 06254058

(51) Int. Cl.
*G01L 9/12* (2006.01)
(52) U.S. Cl. .......................... 73/718; 73/724
(58) Field of Classification Search .......... 73/718, 73/724
See application file for complete search history.

(56) References Cited
U.S. PATENT DOCUMENTS

| 3,787,764 A | 1/1974 | Andeen et al. |
| 4,204,244 A | 5/1980 | Ho |
| 4,459,856 A | 7/1984 | Ko et al. |
| 4,545,254 A | 10/1985 | Lawless et al. |
| 4,924,701 A | 5/1990 | Delatorre |
| 2004/0159158 A1 | 8/2004 | Forster |
| 2004/0164868 A1 | 8/2004 | Thomas |

FOREIGN PATENT DOCUMENTS

| DE | 3023218 A | 2/1982 |
| GB | 2111749 | 7/1983 |
| KR | 20040100001 | 12/2004 |

*Primary Examiner*—Andre J Allen
(74) *Attorney, Agent, or Firm*—Willard Jones, II; Eric J. Schaal

(57) ABSTRACT

A method and apparatus for monitoring the pressure of a fluid within a rigid vessel are disclosed. A preferred method comprises monitoring the capacitance of a capacitor comprising a deformable resilient solid dielectric separating first and second conductive elements, the capacitor being exposed to said pressurised fluid such that the distance between the conductive elements and thus the capacitance of the capacitor changes with compression or relaxation of the dielectric in response to changes in fluid pressure.

42 Claims, 9 Drawing Sheets

METHOD AND APPARATUS FOR MONITORING FLUID PRESSURE

TECHNICAL FIELD OF THE INVENTION

The present invention relates to methods and apparatus for monitoring and supplying pressurised fluids, in particular methods and apparatus which can be applied to systems where fluids of relatively high pressure (e.g. about 2 MPa (20 bar) or higher) are present, such as for example manufacturing plants utilising high pressure fluids or the supply of fluids in high pressure cylinders.

BACKGROUND OF THE INVENTION

Various types of sensor for detecting pressure in a fluid are known. The most conventional type uses an elastic diaphragm equipped with strain gauge (sometimes called piezoresistive) elements. However, although one of the lowest cost pressure sensors currently made, these sensors tend to be relatively large in size, and have a mechanical structure which although producible by mass-production photolithographic methods is still relatively complex and expensive to make. They also have a certain degree of fragility and require calibration and temperature compensation before they can be used.

Pressure sensors comprising a flexible, resilient diaphragm and which utilize capacitance in their action are also known. For example, U.S. Pat. No. 4,204,244 discloses a pressure sensor, which can be used in automobile internal combustion engines, comprising a flexible diaphragm and a rigid base member separated at their circumferences by an annular wall. The diaphragm and the base member each carry an electrode, and a reference vacuum is stored in the enclosure formed by the diaphragm, base and wall, changes in external pressure causing the diaphragm to flex so changing the capacitance of the sensor.

Other pressure sensors, used most often in water and commonly known as hydrophones, employ a piezoelectric solid as their active element. However, these sensors can only be used for pressure values which change rapidly, on a timescale of seconds or less, as they suffer from rapid zero drift.

U.S. Pat. No. 4,924,701 discloses a pressure sensor for use in high pressure environments, such as underground oil reservoirs, for detecting small changes in pressure. The sensor comprises first and second capacitors defined by fixed first and second capacitor plates on either side of a common capacitor plate, with a gaseous dielectric medium between the plates. The plates and gaseous medium are enclosed in a housing including a diaphragm which flexes with changes in pressure of the fluid being measured, thus causing the gaseous dielectric medium to compress or expand changing its dielectric constant and so the total capacitance of the system. The substrate carrying the common capacitor plate flexes with changes in temperature, so allowing such changes to be detected via the relative change in the capacitance of the first and second capacitors.

DE 3023218A1 discloses a capacitive pressure sensor comprising two electrically conductive coverings separated by an elastic electrically insulating layer containing gas inclusions. As pressure increases, the insulating layer and gas inclusions are compressed, increasing the capacitance of the sensor. The gas inclusions are used to reduce the elastic modulus of the dielectric, and so increase the sensitivity of the sensor. In one embodiment, a stretched polypropylene film is used as the insulating layer, and in another ground rubber particles are used. No examples of use of the sensor are given.

US 2004/0159158 A1 describes a similar capacitive pressure sensor, comprising a pair of conductive plates separated by a compressible dielectric, for use in sensing the pressure inside a car tire. Use of a separate temperature sensor, such as a anemometer, semiconductor device, chemical device or thermistor, to allow for temperature compensation is suggested. Techniques for correcting for centripetal force are also disclosed. Silicone foam material, rubber material, synthetic rubber material, neoprene, polyurethane foam, and polytetrafluoroethylene (PTFE) foam are suggested as suitable dielectrics. In an exemplary embodiment, silicone foam rubber is used.

U.S. Pat. No. 4,545,254 discloses a further capacitive sensor in which the electrodes are separated by a dielectric material selected from specific pyrochlore ferroelectric ceramic materials. It is stated that the sensor is suitable for use in cryogenic temperatures, but no further indication is given as to intended or suitable uses of the sensor.

U.S. Pat. No. 3,787,764 discloses a capacitive pressure sensor, comprising a pair of electrodes separated by a solid dielectric material, for use in measuring fluid pressure in a container. The capacitor is used to measure fluid pressures up to 35,000 psi. In the exemplified embodiments, an ionic crystal of calcium fluoride is used as the solid dielectric material.

U.S. Pat. No. 4,459,856 discloses a capacitive pressure transducer system comprising a reference capacitor and a pressure sensitive capacitor. The capacitors both comprise a first and second electrically conductive layers separated by a compressible dielectric, compression of the reference capacitor dielectric being restrained by an insulative wall portion. The capacitors form part of a circuit which provides a voltage output correlated to the difference in capacitance between the two capacitors.

US 2004/0164868 describes a carbon dioxide fire extinguishing device comprising a capacitive measuring device for detecting gas loss from the carbon dioxide pressure tank. The capacitive measuring device comprises a probe, which preferably extends the entire height of the pressure vessel, and comprises two coaxial tubular electrodes, with liquid, gaseous or supercritical carbon dioxide forming the intermediate dielectric.

KR20040100001 describes a breathing apparatus comprising a high pressure air cylinder, a pressure sensor for measuring air pressure, and a transmission unit for transmitting the remaining pressure to a wireless display unit on the respiration unit interface.

GB 2111749 describes a power capacitor comprising a plurality of capacitor elements. The capacitor elements comprise first and second foils wound together, a solid dielectric material comprising polymer films separating the first and second foils from each other. The polymer film is preferably polypropylene. Other polymers that can be used are polyethylene, copolymerisates of ethylene and propylene and polymethylpentane, polycarbonate, polyethyleneglycolterephthalate, and polyimide.

SUMMARY OF THE INVENTION

According to a first aspect of the present invention, a method of monitoring the pressure of a fluid within a rigid vessel is provided, comprising monitoring the capacitance of a capacitor comprising a deformable resilient solid dielectric separating first and second conductive elements, the capacitor being exposed to said pressurised fluid such that the distance between the conductive elements and thus the capacitance of the capacitor changes with compression or relaxation of the dielectric in response to changes in fluid pressure.

According to a second aspect of the present invention, a rigid vessel for a pressurised fluid is provided, the vessel including a capacitor comprising a deformable resilient solid dielectric separating first and second conductive elements, the capacitor being positioned such that it is exposed to said pressurised fluid, when the fluid is present in the vessel, such that the distance between the conductive elements and thus the capacitance of the capacitor changes with compression or relaxation of the dielectric in response to changes in fluid pressure.

According to a third aspect of the present invention, a method of supplying pressurised fluid is provided, comprising filling a vessel according to the second aspect, wherein the vessel is a container suitable for transport to a point at which the fluid is to be dispensed, and supplying the filled container.

According to a fourth aspect of the present invention, a method of supplying pressurised fluid is provided, comprising filling a container with fluid and transporting the filled container to the point at which the fluid is to be dispensed, the container including a device for sensing the pressure of the fluid and a device operative to transmit a signal when fluid pressure has dropped below a predetermined level, and supplying a further filled container when said signal is received from a previously supplied container. Preferably, the device transmits a wireless signal, which is relayed via a communications network.

DETAILED DESCRIPTION OF THE INVENTION

Figure 1:
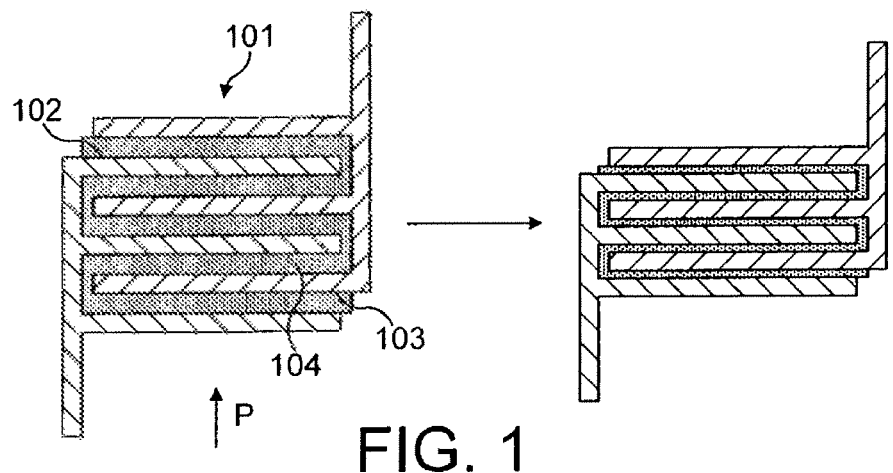
FIG. 1 shows the operation of a capacitor as a pressure sensor.

Preferably the fluid being monitored according to the method of the first aspect of the present invention, as described above, has at least at times a relatively high pressure, i.e. a pressure of at least about 2 MPa (20 bar). Preferably the pressure of the fluid does not exceed about 30 MPa (300 bar), although pressures up to 100 MPa (1000 bar) may be used in some circumstances. The rigid vessel may be of any type suitable for containing and/or transferring pressurised fluids, such as for example a conduit, holding tank, separation column, storage container, transportable gas cylinder, and so on. Clearly, the vessel must be suitable for withstanding fluid pressures within the range with which it is intended to be used.

The present inventors have discovered that capacitors comprising a deformable resilient solid dielectric separating first and second conductive elements can be reliably used, as described above, in detecting pressure changes in high pressure fluids, such as those of about 2 MPa (20 bar) or above. Such capacitors are robust and can be produced in a straightforward and economical manner using mass production techniques, providing significant benefits in environments where fluid needs to be monitored at high pressures and in numerous locations.

As appropriate and desired, the capacitance of the capacitor can be directly monitored, for example by having the capacitance displayed as digital or analogue read-out, or the capacitance can be converted into another format which can be more conveniently monitored. For example, the capacitance can be converted into a voltage output, as described in greater detail below. Alternatively, a simple binary signal could be produced, such as for example a light which is activated or deactivated when the capacitance indicates that pressure has dropped below, or risen above, as desired level. Equally, such digital/analogue displays, lights or other forms of indicator may be placed on or proximate to the vessel itself and/or, as may be convenient where fluid pressure in multiple vessels is to be monitored, the relevant data may be transmitted via any suitable means (such as a wireless or wired communications network) to a another location.

In a preferred embodiment, the method further comprises monitoring the capacitance of a second capacitor comprising first and second conductive elements separated by a deformable resilient solid dielectric, the second capacitor being located such that it is not exposed to the pressurised fluid so as to provide a reference capacitance independent of changes in the pressure of the fluid.

The second capacitor can, for example, be used to measure the effects, if any, of changes in temperatures on capacitance, which effects can then compensated for when determining changes in fluid pressure. Where present, the reference capacitor is preferably of similar, and more preferably of substantially identical construction and materials to the capacitor pressure sensor.

Preferably, the first and second capacitors form part of a circuit which provides a voltage output, more preferably a DC voltage output, correlated to the difference in capacitance between the two capacitors, the method comprising monitoring said voltage output. Exemplary circuits include flip-flop oscillator circuits (DC output) and Wheatstone bridge circuits (AC output).

Preferably, the vessel is a container comprising means for dispensing the pressurised fluid, such as an outlet with a breakable seal or a valve assembly for regulating flow of fluid through the outlet. It is preferred that the container is of a type than can used for storing pressurised fluids during transport from a filling station to a point of use. In particular, it is preferred that the container is a refillable transportable gas cylinder or bottle, or similar such devices that are relatively easy to transport without requiring recourse to heavy goods vehicles and the like. Such containers are typically themselves of low cost and used in large numbers, such that the method of the present invention is of particular advantage when applied to these containers.

The container may be accompanied by a device operative to transmit a signal when the capacitance indicates that the fluid pressure in the container has dropped below a predetermined level, the method comprising monitoring for said signal. The device may be operative to transmit a wireless signal, facilitating monitoring of fluid pressure in containers which are not centrally located.

Preferably the temperature of the fluid is about −20 to +100° C., more preferably about room temperature. Preferably the fluid is a gas. Exemplary gases include oxygen for medical applications, oxygen and oxygen/argon mixtures for welding, hydrogen for transport, and hydrogen and helium for laboratory applications.

The dielectric preferably has a Bulk Modulus (K) of at least about 1 GPa, more preferably a (K) of about 1 to about 10 GPa, more preferably a (K) of about 1 to 6 GPa, most preferably a (K) of about 1 to 4 GPa.

The bulk modulus of a material is defined according to the relationship bulk modulus=impressed pressure/(change in volume/original volume), and is equal to slope of a material's compressive stress/strain curve.

The bulk modulus of, for example, polymer materials is often calculated using the ASTM D695 or ISO604 method, in which the test specimen is compressed between two compression plates and compressive strain measured using an extensometer.

However, when selecting dielectric materials for the present invention the bulk modulus of a material is preferably calculated by a hydrostatic pressure method using a PVT instrument such as a hydraulic (water) or mercury dilatometer. In this method a sample of known volume is immersed in water within a container, the container introduced into a pressure vessel and pressure applied, and a measurement made of the applied pressure and the change in the volume of the material undergoing measurement based on the change in the height of the water in the container. The temperature is kept constant at room temperature, eg. about 23° C. Other aspects of the test procedure may for example be conducted in accordance with the above ASTM or ISO test method. In most cases the bulk modulus of a polymer material calculated by the ASTM/ISO method or dilatometer method will be similar. However, the dilatometer method is considered more generally applicable and to provide more accurate readings for the purposes of the present invention.

By way of example, a design of dilatometer suitable for use in the above method is described in "A new pressurizable dilatometer for measuring bulk modulus of thermosets", Meng, O'Connell, McKenna and Simon, ANTEC 2005, pages 3256-3260, which describes a mercury dilatometer which, in the case of this particular article, was used to measure the time dependent modulus of various thermosets.

The inventors have found that solid dielectric materials having an Bulk Modulus (K), also referred to as compressive modulus of elasticity or simply compressive modulus, of at least about 1 GPa perform favourably compared to various dielectric materials used in the prior art when used in a capacitor for detecting pressure changes at high pressures. If lower modulus materials are used it has been found that the dielectric can be susceptible to damage and/or permanent change in dimensions resulting from creep and/or compression set, and the resulting capacitors have also been found less accurate in detecting changes in pressure. A maximum (K) of about 10 GPa is preferred, as when higher modulus materials are used these have been found by the present inventors to be insensitive in many cases to pressure changes even at relatively high pressures.

By way of example, materials used in the prior art as a dielectric and typically having a bulk modulus below 1 GPa include most natural and synthetic rubbers and silicone elastomers (typically 50 to 150 MPa). It should be noted that while typical K values are listed above, the actual modulus of a polymer material is dictated not only by the types and/or mixture of polymers used, but can also be effected by the presence of additives (such as extenders or fillers) and the process by which the polymer is made.

Dielectric materials having a bulk modulus well above 10 GPa include most, if not all, ceramic dielectrics (bulk modulus in the region of 70 to 80 GPa).

The solid dielectric is preferably a polymer, more preferably a polymer comprising a polycarbonate polymer or a polyester polymer.

The present inventors have found polymers to perform better than other solid dielectric materials such as ceramic dielectrics. Polymers typically having a bulk modulus within the preferred range noted above are preferred. Exemplary polymer types include but are not limited to polycarbonates (typically about 3 GPa), polypropylenes (about 1.5 GPa), polystyrenes (about 2 GPa), polyesters (about 3.75 GPa) and PTFEs (about 3.75 GPa). Where appropriate, co-polymers and/or polymer blends can also be used as can additives or fillers for improving certain mechanical or chemical properties of the polymer(s) as is well known in the art. When using such co-polymers, blends, additives and/or fillers, the effect on the bulk modulus of the material should, of course, be considered.

As noted above, use of a polycarbonate polymer and/or polyester polymer as the dielectric is particularly preferred. The inventors have found dielectrics made from these polymers to have especially desirable properties. When these dielectrics have been used, the inventors have found that the capacitor rapidly and reversibly deforms under pressures from at least 0 to 300 bar, leading to fast changes in capacitance accurately corresponding to changes in fluid pressure. Moreover, the base line (i.e. capacitance once pressure has been returned to the starting level) remains stable, meaning that the results produced by the capacitor remain accurate in spite of repeated use. By comparison, some of the capacitors tested using other polymers as the dielectric showed changes in capacitance which were not reversible or a capacitance which changed slowly with time after an initially good response.

The solid dielectric is preferably at least substantially free of open or closed pores or cells. Thus, in contrast to some of the prior art dielectric materials, it is preferred that the dielectric is not a foamed material or otherwise provided with a generally porous or cellular structure for example for the purpose of providing gas inclusions. Use of such techniques will add to the complexity and cost of the making the capacitor and the inventors have found a foamed or cellular structure to be unnecessary in the present application. Gas ingress into the foam may occur and cause problems. Foamed polymers typically have a significantly reduced bulk modulus as compared to the equivalent unfoamed polymer (for example, foamed polyurethane typically has a bulk modulus of about 100 MPa, and the bulk modulus of wet foamed polyurethane can be as little as about 5 MPa). The presence of gas inclusions may also lead to other mechanical disadvantages, such as exacerbating problems of hysteresis and drift due to creep and compression set of a polymer material.

The dielectric constant of the dielectric is not believed by the inventors to be critical to the present invention, although dielectrics having a dielectric constant from about 2 to about 15 epsilon may in general be preferred.

The capacitor may comprise first and second conductive sheets separated by one or more sheets of the solid dielectric. The conductive sheets may be metal or metallic foils, which are laminated to the solid dielectric material, for example using a suitable adhesive. Alternatively, the conductive sheets may be formed directly on the dielectric sheet or sheets as a metallic layers, for example by vacuum deposition. If desired, different methods of construction may be used for different conductive sheets.

Such forms of capacitor are preferable, as they can be made in a straightforward manner using conventional techniques for manufacturing capacitors. In one common technique, a metallic foil or layer is applied to both sides of a solid dielectric sheet, which is then rolled up, folded, or stacked with a sheet of solid dielectric having no metallic layer. In an alternative technique, a metallic foil or layer is applied on one side only of two sheets of solid dielectric, which are then rolled/folded/stacked together to make the capacitor. The latter technique, although useable, may be less preferred due to the potential for fluid to penetrate between the two dielectric sheets separating the conductive sheets.

The thickness of each of the conductive sheets is preferably approximately two or more orders of magnitude less than the total thickness of the dielectric sheet(s). This is because the behaviour of the capacitor sensor will also depend to some extent upon the relative thicknesses of the conductive elements and dielectric. If the conductive sheets are sufficiently thin, they will be stretched or compressed slightly when the capacitor is pressurized and the dielectric will be approximately isotropically squeezed, giving a good reproducible results with few irreversible effects. If, however, the conductive sheets are relatively thick then the high modulus of the metal (~100 GPa), as compared to the lower modulus of a solid polymer dielectric, may have the undesirable effect of causing the sheet of dielectric to squeeze out sideways enhancing any creep and compression set effects. Therefore, a capacitor construction which uses a thin metal or metallic layer will normally be preferred. Many varieties of polymer-dielectric capacitors manufactured for use in electronic equipment may be suitable in this respect, being constructed, for example, with a polymer dielectric thickness of the order of about 10 micrometers and a vacuum-deposited metallization which is of the order of about 30 nanometres in thickness.

The capacitor may also include a coating to prevent or inhibit penetration of pressurised fluid into or around the solid dielectric separating the first and second conductive elements. This is particularly preferred where a porous or cellular material is used as the dielectric, and/or where the sensor is made using more than one sheet of solid dielectric to separate the conductive elements such that there is a potential for fluid to penetrate between these sheets (as discussed above).

The capacitor preferably, but not essentially, has a capacitance of about 10 to about 1000 nF, more preferably about 20 to about 700 nF.

The vessel of the second aspect of the present invention, as described above, is preferably further accompanied by a second capacitor comprising first and second conductive elements separated by a deformable resilient solid dielectric, the second capacitor being located such that it is not exposed to the pressurised fluid, when the fluid is present in the vessel, so as to provide a reference capacitance independent of changes in the pressure of the fluid. The first and second capacitors preferably form part of a circuit which provides a voltage output correlated to the difference in capacitance between the two capacitors.

In the method of supplying pressurised fluid according to the third aspect of the present invention, as described above, the vessel is preferably filled with fluid up to a pressure of at least about 2 MPa (20 bar), and less than about 30 MPa (300 bar).

The container is preferably accompanied by a device operative to transmit a signal when the capacitance indicates that the fluid pressure in the container has dropped below a predetermined level, the method comprising supplying a further filled container when said signal is received from a previously supplied container. In a particularly preferred embodiment, the device transmits a wireless signal, such as for example a radio-frequency signal, which is relayed via a communications network, such as for example a telephone network.

Further preferred embodiments of the second and third aspects of the present invention will be apparent from reference to the preferred embodiments of the first aspect, as described above.

Illustrative embodiments of the invention will now be described, solely by way of example, with reference to the accompanying drawings.

FIG. 1 shows a capacitor (101) comprising a first set of parallel conductive plates (102) forming a first electrode and interleaved with a second set of parallel conductive plates (103) forming a second electrode, the plates being separated by a deformable solid dielectric (104). The plates can either consist of very thin metal foils, or metallic layers formed directly on the polymer layer. As the plates are squeezed together in response to an increase in pressure (P) the capacitance increases.

Figure 2:
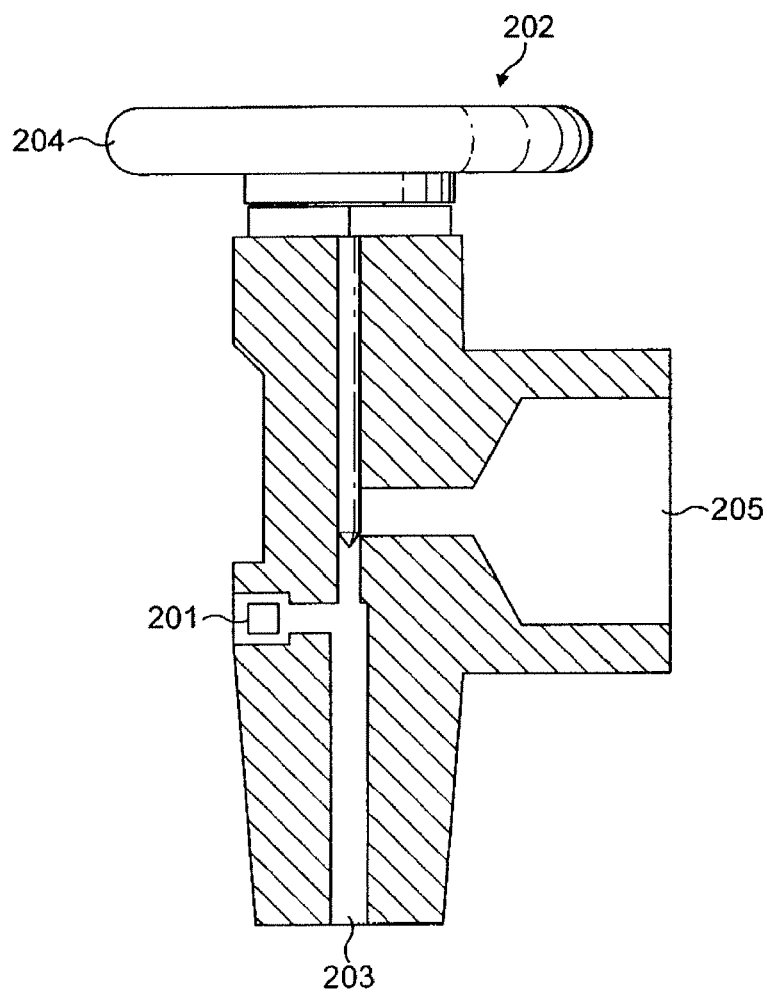
FIG. 2 is a schematic representation of a capacitor installed in a valve assembly for a pressurised cylinder.

FIG. 2 shows a capacitor (201) installed in a valve assembly (202) for a high pressure gas cylinder (not shown). Installation of the capacitor is aided by the very small size of the sensor. The capacitor is located in a closed side branch of the valve inlet (203), upstream of the valve outlet (205), opening of the valve being controlled by a hand wheel (204).

Figure 3:
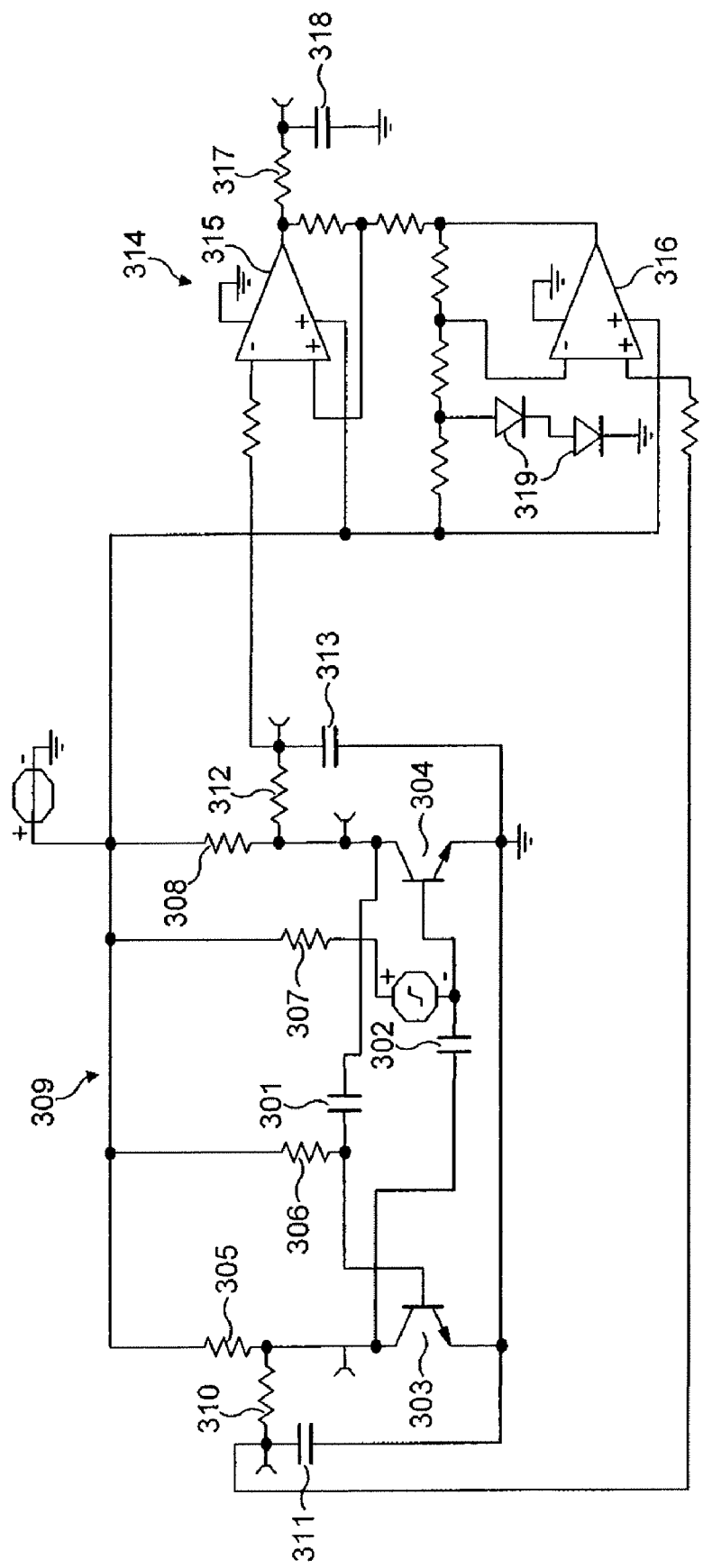
FIG. 3 is a schematic representation of a flip-flop readout circuit for producing a DC voltage readout correlated to pressure.

FIG. 3 shows a flip-flop oscillator circuit (also known as a multivibrator oscillator circuit) for producing a DC voltage readout which varies with fluid pressure. The circuit comprises a capacitor exposed to the pressurized fluid (the sensor capacitor) and a capacitor which is not exposed to pressure changes in the fluid (the reference capacitor) coupled to two transistors. The output from the transistors consists of a square wave in which the Flip time is proportional to the capacitance of the sensor capacitor, and the Flop time is proportional to the capacitance of the reference capacitor. As the sensor capacitance changes relative to that of the reference capacitor, the flip-to-flop ratio (i.e. the mark-space ratio of the square wave) changes correspondingly. The circuit then averages the square wave into a voltage V, the difference between V and a predetermined reference voltage $V_{ref}$ being amplified to give output voltage Vo.

More specifically, and with reference to FIG. 3, the flip-flop circuit (309) is formed of first and second capacitors (301, 302), transistors (303, 304) and resistors (305, 306, 307 and 308). The first capacitor (301) is placed inside a high pressure vessel in contact with pressurised fluid, for example as shown in FIG. 2, and the second capacitor (302), which is of identical construction to the first capacitor, is placed so that it is not exposed to changes in fluid pressure but is at least largely exposed to the same changes in temperature as the first capacitor. The circuit outputs are on the collectors of the transistors and consist of a square wave in which one output is high whilst the other is low.

The circuit outputs are filtered by the RC filters formed by resistor (310) and capacitor (311) and by resistor (312) and capacitor (313). These filtered outputs are fed to a differential amplifier (314) formed by op amp circuits (305, 306) and their surrounding components, the output voltage of which is proportional to the difference between its two input voltages, and thus is proportional to the change in capacitance of the first and second capacitors (101 and 102) and so the change in pressure of the fluid.

A further RC filter formed by resistor (315) and capacitor (318) smoothes the output from the differential amplifier. The diodes (319) give a 1.1 volt reference to ensure that the circuit has a suitable DC offset positive from zero, which is convenient to be able feed to an electronic data system which can only accept positive inputs.

Figure 4:
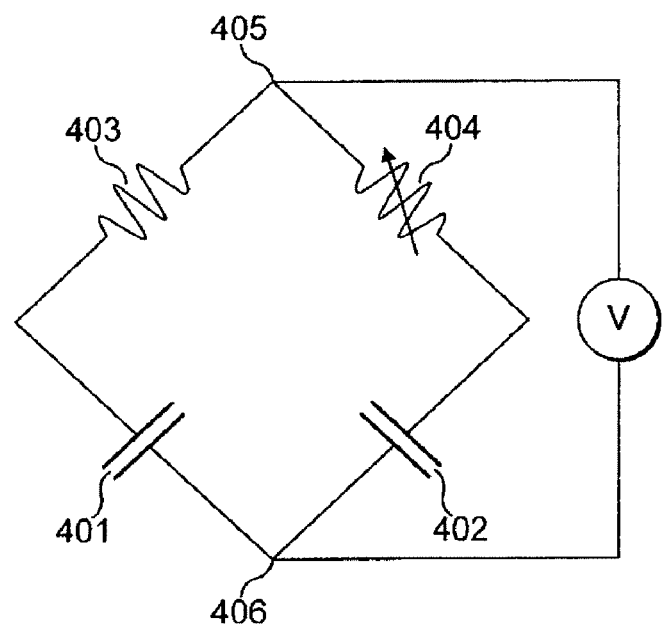
FIG. 4 is a schematic representation of a Wheatstone bridge readout circuit for producing an AC voltage readout.

FIG. 4 shows a Wheatstone bridge circuit for producing an AC output which varies with changes in fluid pressure. The circuit is formed by a first capacitor (401) which is exposed to changes in fluid pressure, a second capacitor (402) of identical construction but which is not exposed to changes in fluid pressure, and a pair of resistors (403 and 404). When fed with an AC voltage at points 405 and 406, the voltmeter detects an AC voltage which is proportional to the capacitance difference between the sensor and reference capacitors. The voltmeter readout is thus indirectly a measurement of pressure.

Figure 5:
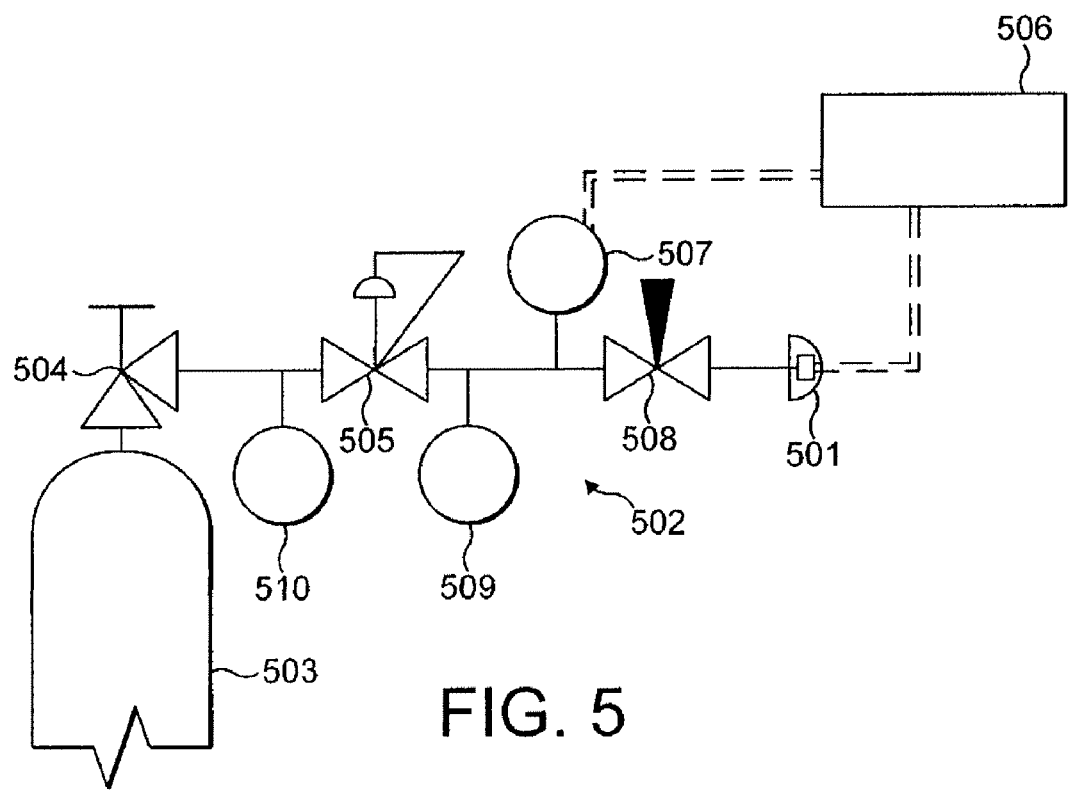
FIG. 5 is a schematic representation of the test rig used to record the data plotted in FIGS. 6 to 12.

FIG. 5 shows an experimental rig which was used to obtain the results shown in FIGS. 6 through 9, further discussed below. A capacitor (501) was placed just downstream of pressure regulator (505) inside a fitting (502) connected to outlet (504) of high pressure air cylinder (503). The capacitor was linked through a high-pressure feed through fitting to a flip-flop circuit, having the features shown in FIG. 3, which in turn was linked to a computer data logger (506). A high-accuracy electronic pressure gauge (507) was used as a reference gauge to provide pressure readings known to be accurate, and was also linked to the computer which could thus log the voltage output from the pressure gauge (507) and the flip flop circuit, flow of gas to the pressure gauge (507) and capacitor (501) being controlled by an isolation valve (508). Low accuracy pressure gauges (509, 510) were used on either side of the pressure regulator (505), to monitor operation of the regulator and further confirm correct operation of the pressure gauge (507).

In use of the experimental rig, the cylinder (503) was opened to let out gas and the pressure supplied to the capacitor (501) and/or pressure gauge (507) adjusted with the pressure regulator (505). The data, i.e. the recorded pressure (voltage output from the pressure gauge) and capacitance (voltage output from the flip-flop circuit) over time, was downloaded on the computer, thus providing the data for the curves shown in the following Figures for the various types of capacitor dielectrics tested.

Figure 6:
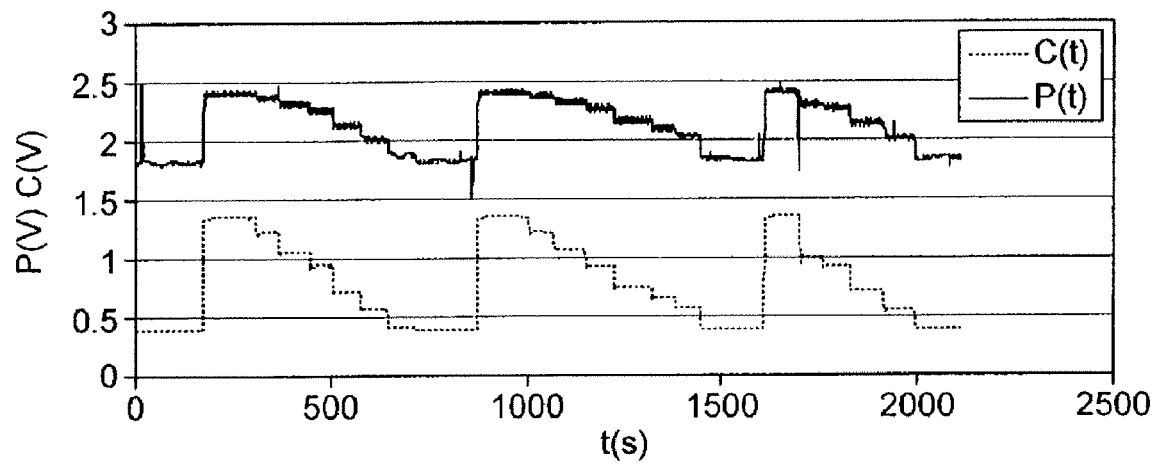
FIG. 6 is a graph logging the change in voltage over time produced by the reference electronic gauge and by the flip-flop circuit of FIG. 5, where polyester 0.68 µF was used for the capacitor dielectric.

FIG. 6 shows the change in capacitance (recorded in terms of the voltage output, C(V), of the flip-flop circuit) over time (measured in seconds) for a capacitor using a Polyester 0.68 μF dielectric (line C(t)), as well as the change in pressure (again recorded in volts, P(V)) over the same time period as measured by the high-accuracy pressure gauge (line P(t)). As can be seen, a fast response of changes in capacitance is obtained as the pressure is changed, and the base line is identical after three pressure cycles. Thus it is clear that, with this capacitor, changes in capacitance accurately follow changes in pressure.

Figure 7:
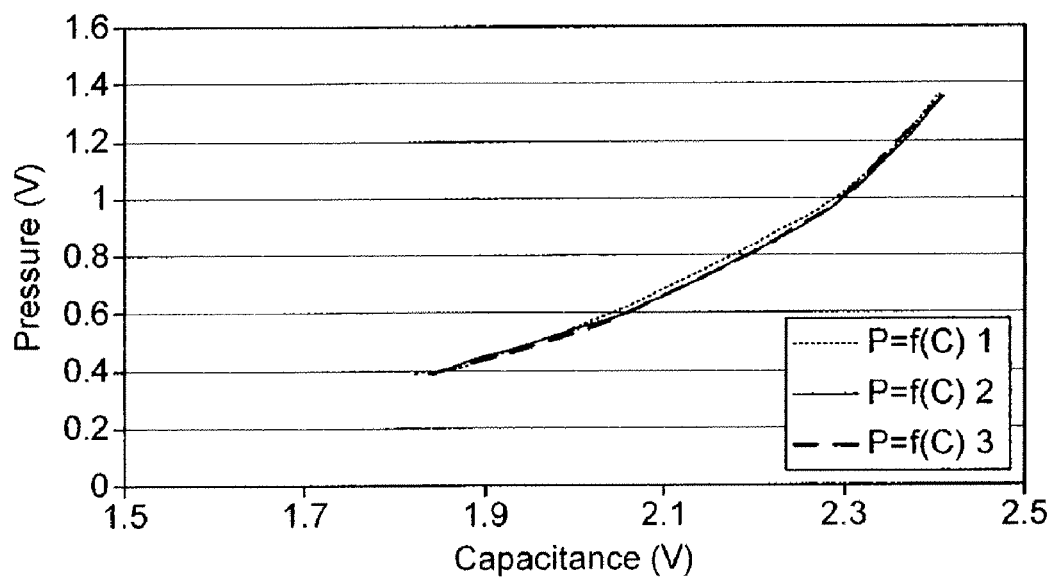
FIG. 7 is a graph plotting the pressure reading (in volts) from the reference gauge against the capacitance reading (in volts) from the polyester 0.68 µF capacitor, superimposing three runs.

FIG. 7 plots pressure (in volts) recorded from the reference gauge against capacitance from the capacitor (voltage output from the flip-flop circuit) using the Polyester 0.68 μF dielectric, superimposing the results from the three pressure cycles. The close correspondence between curves demonstrates the reproducible nature of the pressure recordings obtainable using this capacitor.

Figure 8A:
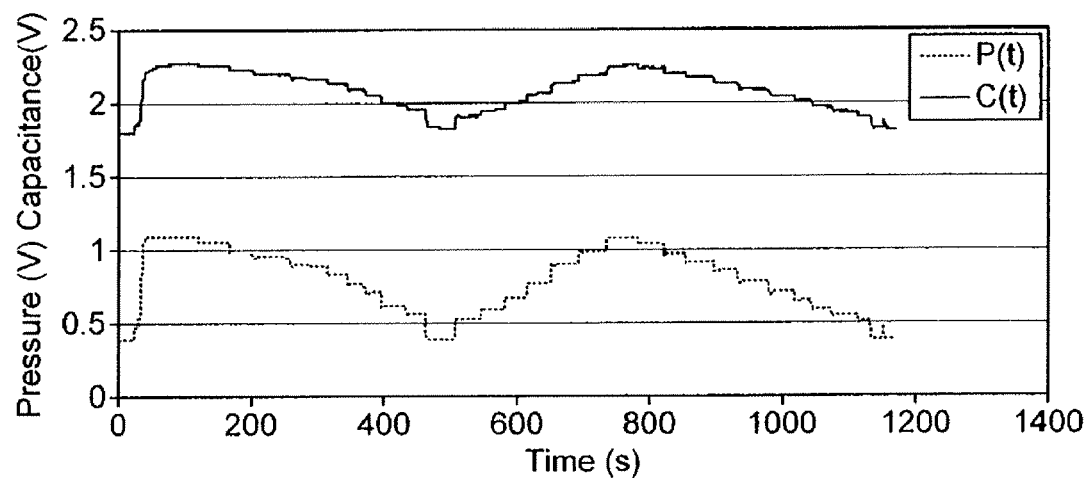
FIGS. 8(a) and (b) are graphs logging the change in voltage over time produced by the reference gauge and by the flip-flop circuit of FIG. 5, where Polycarbonate 22 nF (FIG. 8a) and 470 nF (FIG. 8b) were used for the capacitor dielectric.
Figure 8B:
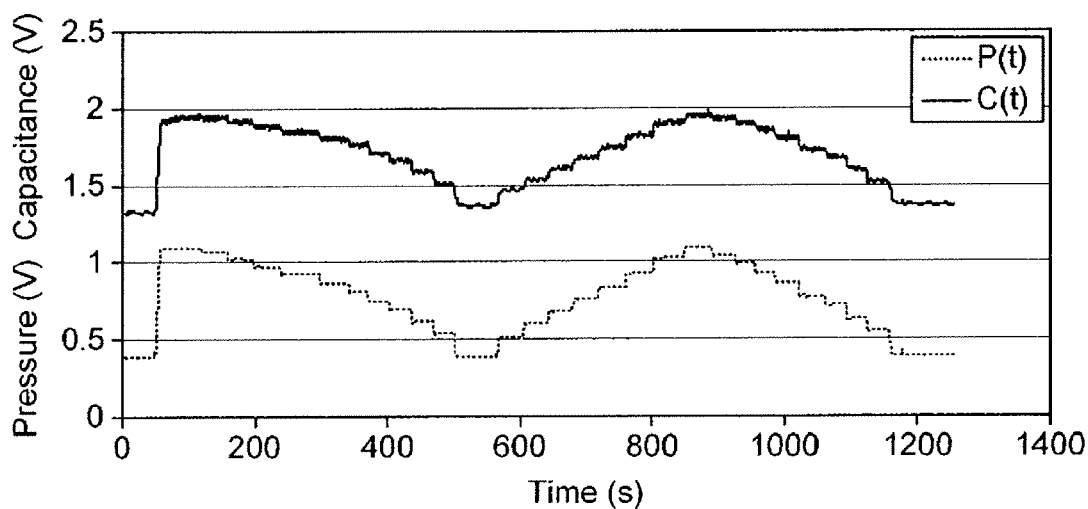

FIGS. 8*a* and 8*b* show, in a similar manner to FIG. 6, the change in capacitance over time for a capacitors using a Polycarbonate 22 nF (FIG. 8*a*) or a Polycarbonate 470 nF (FIG. 8*b*) dielectric. As can be seen, a fast response of changes in capacitance as the pressure is changed and an identical base line after repeated pressure cycles are again obtained.

Figure 9A:
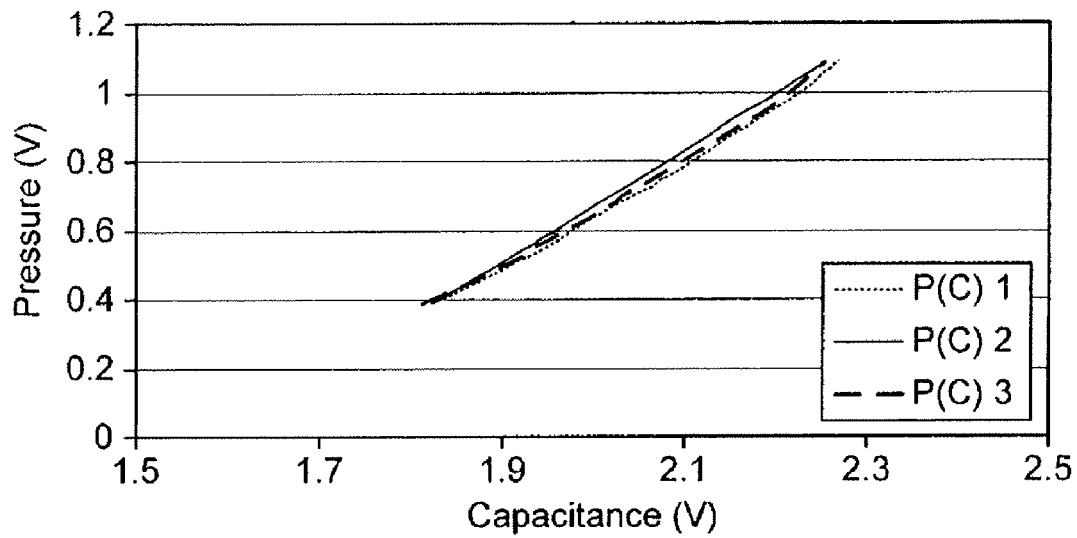
FIGS. 9(a) and (b) are graphs plotting the pressure reading (in volts) from the reference gauge against the capacitance reading (in volts) from the Polycarbonate 22 nF (FIG. 9a) and 470 nF (FIG. 9b) capacitors, superimposing three runs.
Figure 9B:
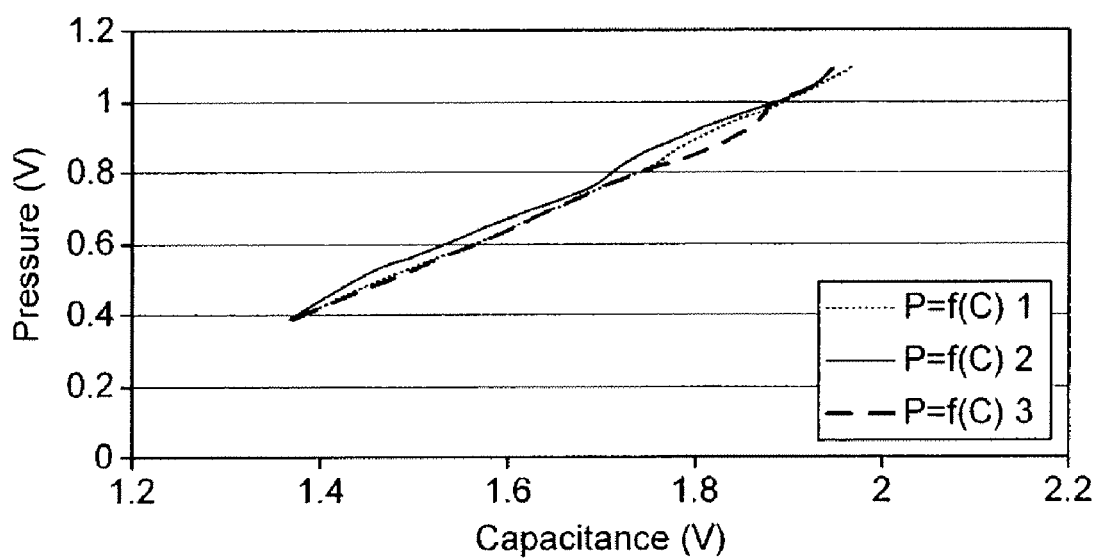

FIGS. 9*a* and 9*b* plots pressure recorded from the reference gauge against capacitance from the capacitors using a Polycarbonate 22 nF (FIG. 9*a*) or Polycarbonate 470 nF (FIG. 9*b*) dielectric, superimposing the results from the three pressure cycles as done in FIG. 7. Again, close correspondence between curves demonstrates the reproducible nature of the pressure recordings.

Figure 10:
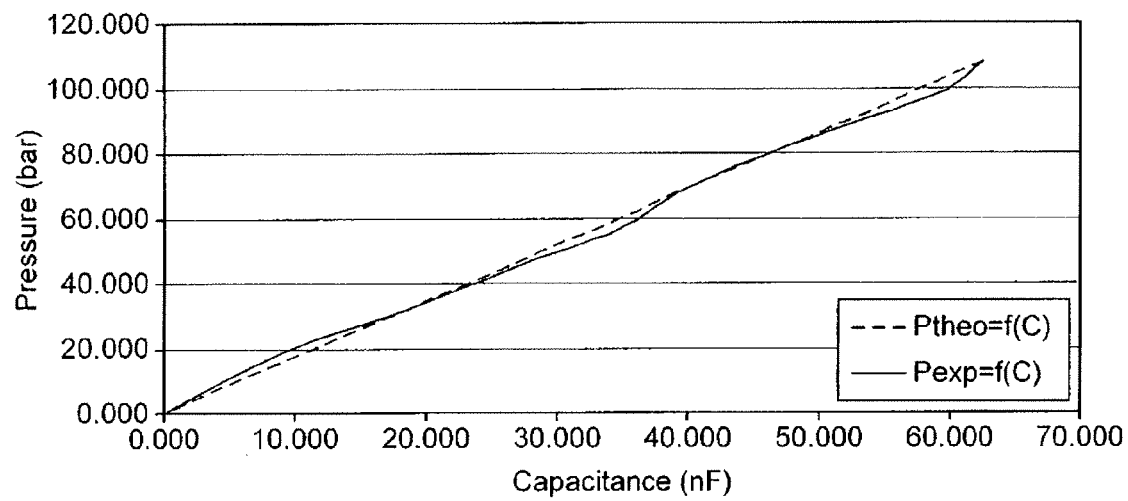
FIG. 10 is a graph plotting fluid pressure versus sensor capacitance for Polycarbonate 470 nF, as compared to a theoretical power law curve.

FIG. 10 plots the pressure from the reference gauge against the capacitance for Polycarbonate 470 nF, superimposed with a power law curve for comparison. It can be seen that the pressure responds to capacitance in an approximately linear fashion according to a power law $$P = \frac{P_{max}}{(C_{max} - C_{min})^x} * (C - C_{min})^x$$

where x has a value which is close to one.

Thus, as shown in FIG. 10, using Polycarbonate 470 nF as the dielectric provides an essentially linear correlation between pressure and capacitance. With other dielectrics where the resulting change of output voltage is not linear with the pressure applied to the capacitor the output voltage can if desired be linearized. This can be done, for example, by using an ADC and EPROM. An analog-to-digital converter (ADC) converts voltage values to digital values which act as an address for data in erasable programmable read-only memory (EPROM). The effect is to transform input voltages to output numbers which are linear with pressure, using a table of numbers recorded in the EPROM. If necessary, a DAC (digital-to-analog converter) can be used to convert the linear numbers to a linear voltage output.

Figure 11:
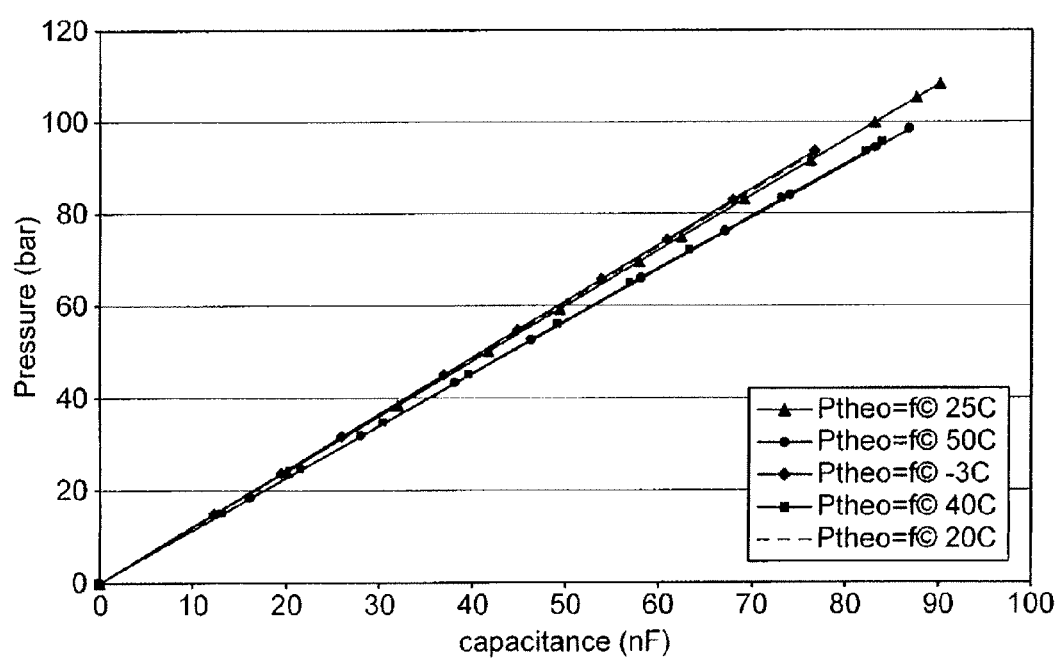
FIG. 11 is a graph plotting recorded fluid pressure versus sensor capacitance for Polycarbonate 470 nF at various temperatures.

FIG. 11 plots, for various different temperatures using best fit power law curves instead of raw data, the change in Polycarbonate 470 nF sensor capacitance versus fluid pressure. It shows that the change of temperature had little effect on the capacitance, with the lines for all temperatures tested (P=f(C) at −3° C., 20° C., 25° C., 40° C. and 50° C.) varying from each other only slightly.

Figure 12A:
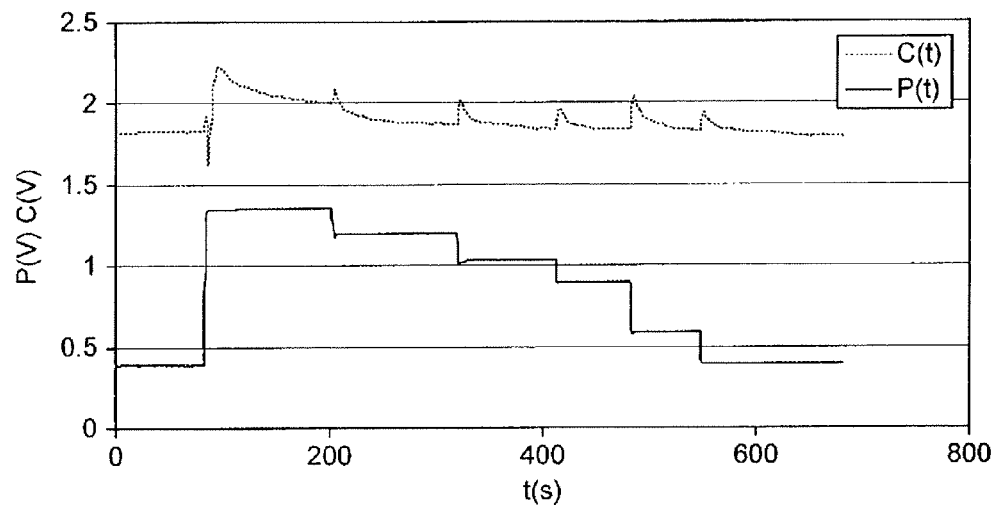
FIGS. 12(a) and (b) are graphs logging the change in voltage over time produced by the reference gauge and by the flip-flop circuit of FIG. 5, where Disc Ceramic 100 nF (FIG. 12a) and MICA 22 nF (FIG. 12b) were used as the capacitor dielectric.
Figure 12B:
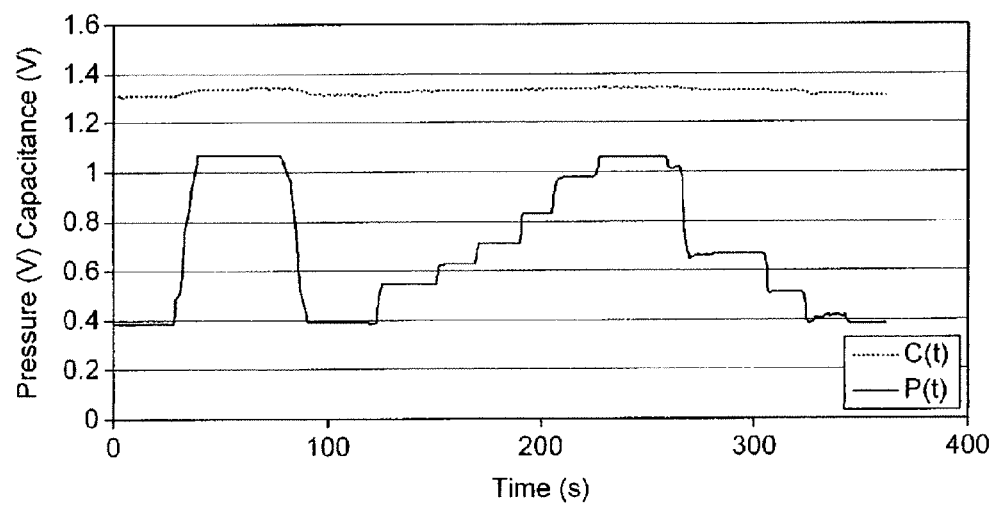

FIGS. 12*a* and 12*b* show, in a similar manner to FIG. 6, the change in capacitance over time for capacitors using Disc Ceramic 100 nF (FIG. 12*a*) and mica 22 nF (FIG. 12*b*) as the dielectric. As can be seen, where disc ceramic 100 nF is used as the dielectric, the graph shows no stabilisation of capacitance after a decrease in pressure; C keeps decreasing and the base line is not reproducible. Where mica 22 nF was used, only small variations of capacitance were seen with at least pressures up to 100 bar. Thus it would appear that these materials are not well suited for monitoring fluid pressure at ambient temperatures over the pressure range tested.

Figure 13:
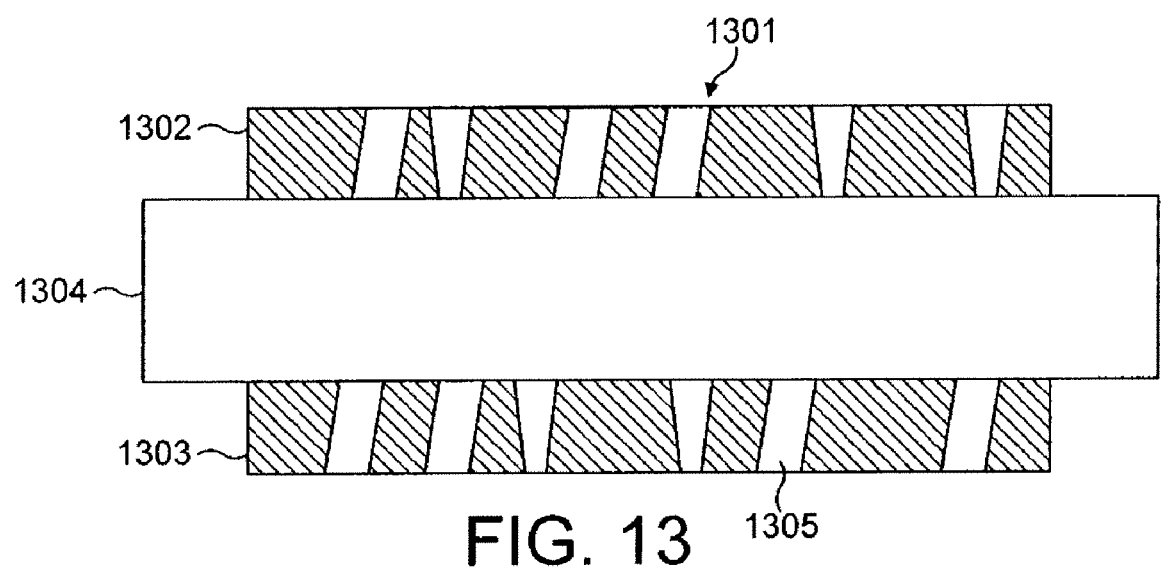
FIG. 13 is a schematic representation of a capacitor structure allowing for gas diffusion.

In the above described tests, a sealed capacitor unit was used to largely prevent gas penetrating into the dielectric. However, if desired a solid dielectric capacitor pressure sensor could be used where gas does, at least to some extent, diffuse into and diffuse out of the dielectric. However, in this case the capacitor should ideally be designed to allow diffusion of gas to take place quickly. Gases such as hydrogen and helium diffuse easily through materials, and such a sensor could be particularly useful in such gases. FIG. 13 shows an example of such a polymer capacitor sensor (1301), in which holes (1305) are provided in one or both of the capacitor plates (1302, 1303) to allow gas from the solid dielectric layer (1304) to diffuse relatively freely.

Figure 14:
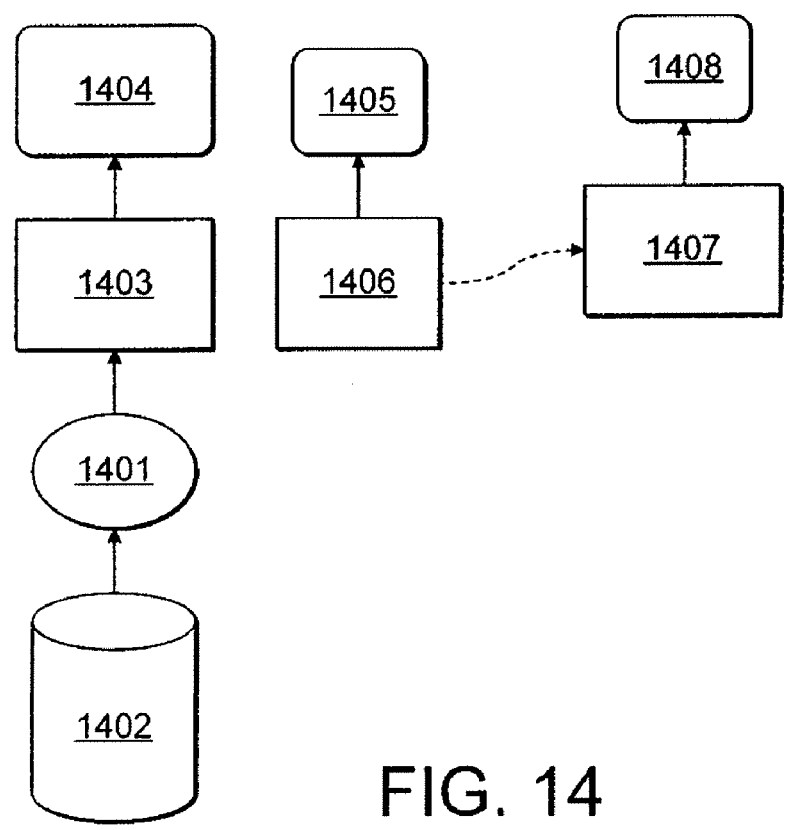
FIG. 14 is a diagram illustrating a method of supplying homecare oxygen.

FIG. 14 illustrates a method of supplying homecare medical oxygen, using a high pressure gas cylinder comprising a capacitor pressure sensor. In a home care medical application the supplier cannot normally ascertain whether a gas cylinder previously supplied to a customer is now empty, thus obliging the supplier to provide extra cylinders for security. By using gas cylinders containing a capacitor pressure sensor greater efficiencies can be achieved. As shown in FIG. 10, oxygen cylinder 1402 contains a capacitor pressure sensor 1401, a capacitance to voltage converter circuit 1403, and a radio-frequency transmission device 1404. The RF device provides a short range communication link to a RF receiver (1405). The RF receiver is in turn connected to a telephone dialer (1406) which is connected to the customer's telephone line, and can link the homecare patient's telephone line to a dialer (1407) at the gas company depot (1408). When the cylinder is low, the system automatically calls up the company for resupply.

It will be appreciated that the invention is not restricted to the details described above with reference to the preferred embodiments but that numerous modifications and variations can be made without departing from the spirit or scope of the invention as defined by the following claims.

The invention claimed is:

1. A method of monitoring the pressure of a fluid within a rigid vessel, comprising monitoring the capacitance of a capacitor comprising a deformable resilient solid dielectric separating first and second conductive elements, the capacitor being exposed to said pressurised fluid such that the distance between the conductive elements and thus the capacitance of the capacitor changes with compression or relaxation of the dielectric in response to changes in fluid pressure, wherein the dielectric is a material having a Bulk Modulus (K) of 1 to 10 GPa and/or comprising a polycarbonate, polypropylene, polystyrene, polyester, and/or polytetrafluoroethylene polymer.

2. A method of monitoring the pressure of a fluid within a rigid vessel, comprising monitoring the capacitance of a capacitor comprising a deformable resilient solid dielectric separating first and second conductive elements, the capacitor being exposed to said pressurised fluid such that the distance between the conductive elements and thus the capacitance of the capacitor changes with compression or relaxation of the dielectric in response to changes in fluid pressure, wherein the vessel is a container suitable for storing pressurised fluids during transport from a filling station to a point at which the fluid is to be dispensed and wherein the dielectric is a material having a Bulk Modulus (K) of 1 to 10 GPa and/or comprising a polycarbonate, polypropylene, polystyrene, polyester, and/or polytetrafluoroethylene polymer.

3. The method of claim 2, wherein the container is a refillable transportable gas cylinder or bottle.

4. The method of claim 2, wherein the container is accompanied by a device operative to transmit a signal when the capacitance indicates that the fluid pressure in the container has dropped below a predetermined level, the method comprising monitoring for said signal.

5. The method of claim 4, wherein the device is operative to transmit a wireless signal.

6. The method of claim 1 or 2, wherein the fluid being monitored has at least at times a pressure of at least about 2 MPa (20 bar).

7. The method of claim 6, wherein the pressure of the fluid does not exceed about 30 MPa (300 bar).

8. The method of claim 1 or 2, wherein the method further comprises monitoring the capacitance of a second capacitor comprising first and second conductive elements separated by a deformable resilient solid dielectric, the second capacitor being located such that it is not exposed to the pressurised fluid so as to provide a reference capacitance independent of changes in the pressure of the fluid.

9. The method of claim 8, wherein the first and second capacitors form part of a circuit which provides a voltage output correlated to the difference in capacitance between the two capacitors, the method comprising monitoring said voltage output.

10. The method of claim 1 or 2, wherein the temperature of the fluid is about −20 to about +100° C.

11. The method of claim 1 or 2, wherein the fluid is a gas.

12. The method of claim 1 or 2, wherein the solid dielectric is a polymer comprising a polycarbonate polymer or a polyester polymer.

13. The method of claim 1 or 2, wherein the solid dielectric is at least substantially free of any open or closed pores or cells.

14. The method of claim 1 or 2, wherein the capacitor comprises first and second conductive sheets separated by one or more sheets of the solid dielectric.

15. The method of claim 14, wherein the thickness of each of the conductive sheets is approximately two or more orders of magnitude less than the total thickness of the dielectric sheet(s).

16. The method of claim 1 or 2, wherein the capacitor includes a coating to prevent or inhibit penetration of pressurised fluid into or around the solid dielectric separating the first and second conductive elements.

17. A rigid vessel for a pressurised fluid, the vessel including a capacitor comprising a deformable resilient solid dielectric separating first and second conductive elements, the capacitor being positioned such that it is exposed to said pressurised fluid, when the fluid is present in the vessel, such that the distance between the conductive elements and thus the capacitance of the capacitor changes with compression or relaxation of the dielectric in response to changes in fluid pressure, wherein the dielectric is a material having a Bulk Modulus (K) of 1 to 10 GPa and/or comprising a polycarbonate, polypropylene, polystyrene, polyester, and/or polytetrafluoroethylene polymer.

18. A rigid vessel for a pressurised fluid, the vessel including a capacitor comprising a deformable resilient solid dielectric separating first and second conductive elements, the capacitor being positioned such that it is exposed to said pressurised fluid, when the fluid is present in the vessel, such that the distance between the conductive elements and thus the capacitance of the capacitor changes with compression or relaxation of the dielectric in response to changes in fluid pressure, wherein the vessel is a container suitable for storing pressurised fluids during transport from a filling station to a point at which the fluid is to be dispensed and wherein the dielectric is a material having a Bulk Modulus (K) of 1 to 10 GPa and/or comprising a polycarbonate, polypropylene, polystyrene, polyester, and/or polytetrafluoroethylene polymer.

19. A vessel as claimed in claim 18, wherein the container is a refillable transportable gas cylinder or bottle.

20. A vessel as claimed in claim 18, wherein the container is further accompanied by a device operative to transmit a signal when the capacitance indicates that the fluid pressure in the container has dropped below a predetermined level.

21. A vessel as claimed in claim 20, wherein the device is operative to transmit a wireless signal.

22. A vessel as claimed in claim 17 or 18, wherein the vessel is further accompanied by a second capacitor comprising first and second conductive elements separated by a deformable resilient solid dielectric, the second capacitor being located such that it is not exposed to the pressurised fluid, when the fluid is present in the vessel, so as to provide a reference capacitance independent of changes in the pressure of the fluid.

23. A vessel as claimed in claim 22, wherein the first and second capacitors form part of a circuit which provides a voltage output correlated to the difference in capacitance between the two capacitors.

24. A vessel as claimed in claim 17 or 18, wherein the solid dielectric is a polymer comprising a polycarbonate polymer or a polyester polymer.

25. A vessel as claimed in claim 17 or 18, wherein the solid dielectric is at least substantially free of any open or closed pores or cells.

26. A vessel as claimed in claim 17 or 18, wherein the capacitor comprises first and second conductive sheets separated by one or more sheets of the solid dielectric.

27. A vessel as claimed in claim 26, wherein the thickness of each of the conductive sheets is approximately two or more orders of magnitude less than the total thickness of the dielectric sheet(s).

28. A vessel as claimed in claim 17 or 18, wherein the capacitor includes a coating to prevent or inhibit penetration of pressurised fluid into or around the solid dielectric separating the first and second conductive elements.

29. A method of supplying pressurised fluid, comprising:
filling a rigid vessel with a pressurised fluid, the vessel being a container suitable for storing pressurised fluids during transport from a filling station to a point at which the fluid is to be dispensed, the vessel including a capacitor comprising a deformable resilient solid dielectric separating first and second conductive elements, the capacitor being positioned such that it is exposed to said pressurised fluid, when the fluid is present in the vessel, such that the distance between the conductive elements and thus the capacitance of the capacitor changes with compression or relaxation of the dielectric in response to changes in fluid pressure, wherein the dielectric is a material having a Bulk Modulus (K) of 1 to 10 GPa and/or comprising a polycarbonate, polypropylene, polystyrene, polyester, and/or polytetrafluoroethylene polymer;
and supplying the filled container.

30. The method of claim 29, wherein the vessel is filled with fluid up to a pressure of at least about 2 MPa (20 bar).

31. The method of claim 30, wherein the vessel is filled with fluid up to a pressure of less than about 30 MPa (300 bar).

32. The method of claim 29, wherein the container is accompanied by a device operative to transmit a signal when the capacitance indicates that the fluid pressure in the container has dropped below a predetermined level, the method comprising supplying a further filled container when said signal is received from a previously supplied container.

33. The method of claim 32, wherein the device is operative to transmit a wireless signal.

34. The method of claim 33, wherein the device transmits a wireless signal, which is relayed via a communications network.

35. The method of claim 29, wherein the container is a refillable transportable gas cylinder or bottle.

36. The method of claim 29, wherein the vessel is further accompanied by a second capacitor comprising first and second conductive elements separated by a deformable resilient solid dielectric, the second capacitor being located such that it is not exposed to the pressurised fluid, when the fluid is present in the vessel, so as to provide a reference capacitance independent of changes in the pressure of the fluid.

37. The method of claim 36, wherein the first and second capacitors form part of a circuit which provides a voltage output correlated to the difference in capacitance between the two capacitors.

38. The method of claim 29, wherein the solid dielectric is a polymer comprising a polycarbonate polymer or a polyester polymer.

39. The method of claim 29, wherein the solid dielectric is at least substantially free of any open or closed pores or cells.

40. The method of claim 29, wherein the capacitor comprises first and second conductive sheets separated by one or more sheets of the solid dielectric.

41. The method of claim 40, wherein the thickness of each of the conductive sheets is approximately two or more orders of magnitude less than the total thickness of the dielectric sheet(s).

42. The method of claim 29, wherein the capacitor includes a coating to prevent or inhibit penetration of pressurised fluid into or around the solid dielectric separating the first and second conductive elements.

* * * * *